United States Patent [19]

Araki

[11] Patent Number: 4,769,911
[45] Date of Patent: Sep. 13, 1988

[54] PIPE CUTTING DEVICE

[75] Inventor: Masaharu Araki, Fuso, Japan

[73] Assignee: Daia Kogyo Kabushiki Kaisha, Aichi, Japan

[21] Appl. No.: 827,901

[22] Filed: Feb. 10, 1986

[30] Foreign Application Priority Data

Nov. 17, 1984 [JP] Japan ............................ 59-242614

[51] Int. Cl.$^4$ .......................................... B23D 21/06
[52] U.S. Cl. ........................................ 30/94; 30/95; 30/97
[58] Field of Search ................ 30/91, 92, 90.4, 94, 30/95, 97

[56] References Cited

U.S. PATENT DOCUMENTS 4,268,959  5/1981  Taira ................................. 30/94

FOREIGN PATENT DOCUMENTS 1013558  12/1977  Canada ............................ 30/94

Primary Examiner—E. R. Kazenske
Assistant Examiner—Willmon Fridie, Jr.
Attorney, Agent, or Firm—Stevens, Davis, Miller & Mosher

[57] ABSTRACT

A pipe cutting device comprises a housing to which a tool case is attached to be rotatable, and by rotating manually or electrically the tool case so that the openings of the tool case and a follow-up gear disposed in the tool case substantially align with the opening provided for the housing, is formed a pipe inserting passage for inserting a pipe from the opening side of the openings of these members towards the central portion of the tool case. Two driving gears meshed with the follow-up gear are driven by a motor through the power transmission mechanism to rotate the tool case. The rotation of the tool case drives the cam roller to operate the cam plate, and the clutch arm is rotated by predetermined angles by every one rotation of the tool case thereby to minutely rotate the eccentric cam by predetermined angles through the one-way clutch. The rotation of the eccentric cam rotates the lever mechanism which is operatively connected to the cutter. Thus, the pipe squeezed between the cutter and the support rollers located in the tool case is cut in minutely by every one rotation of the tool case.

5 Claims, 5 Drawing Sheets

PIPE CUTTING DEVICE

BACKGROUND OF THE INVENTION

This invention relates to a pipe cutting device for cutting plural kinds of pipes such as gas pipes and water pipes at piping work sites.

A pipe cutting device of the type in which a pipe to be cut is squeezed by and between a circular cutter and two support rollers attached to the front end of a lever means of the pipe cutting device and the lever means is then rotated manually to cut off the pipe is well known as a conventional pipe cutting device. Also well known is a pipe cutting device provided with a ratchet mechanism in which a pipe is cut off by rotating rollers and a cutter around the pipe by manually reciprocating the lever of the type mentioned before. In the conventional manner, the pipe cut-in operation by means of the cutter is performed by manually rotating the handle of the pipe cutting device to squeeze the pipe in the radial direction of the cutter.

In a case where a pipe having a considerably long length is to be cut by one conventional pipe cutting device of the type in which the lever means is rotated to cut the pipe, an operator or worker standing on one side of the pipe has to rotate the lever with his hand from the front portion of the operator towards the upper portion of the pipe, then forward portion thereof and finally the lower portion thereof. This lever rotating operation is extremely troublesome for the operator and does not evenly distribute the rotating force to the pipe. With another conventional pipe cutting device provided with the ratched mechanism, the pipe cutting operation is performed by the operator from one side of the pipe to be cut. When it is required to cut a plurality of pipes or a pipe having a considerable thickness in use of this ratchet type cutting device, manual cutting efficiency is not good and repeated reciprocating cutting operations are required for the operator, thus requiring much time and labour for the operator.

Moreover, in the pipe cutting operations of the conventional cutting devices of the type described hereinbefore, troublesome handle screwing operation is frequently repeatedly require for cutting-in operation of the cutter of the cutting device. These defects or disadvantages of the conventional pipe cutting devices will be increased in a case where a lot of pipes such as gas pipes and water pipes are to be cut at the piping work site, for example a building construction field.

SUMMARY OF THE INVENTION

Accordingly, an object of this invention is to eliminate defects or disadvantages encountered in the prior art and to provide an improved pipe cutting device capable of cutting a number of pipes effectively at piping work sites with reduced time and labour for the worker.

According to this invention, this and other objects can be achieved by providing a pipe cutting device comprising a housing provided with an opening, a tool case provided with a follow-up gear secured thereto and attached to one end of the housing to be rotatable about a central axis of the follow-up gear, the tool case and the follow-up gear being provided with openings respectively including therein the central axis of the follow-up gear and substantially aligning with the opening of the housing, all of these openings being opened on a side of the central axis for inserting a pipe to be cut, an electric motor operatively connected to the other end of the housing for driving the tool case, a plurality of support rollers located in the tool case so that outer peripheral surfaces thereof face the opening of the tool case, a cutter located in the tool case at a portion facing the support rollers across the opening of the tool case, a lever mechanism having one end by which the cutter is supported, an eccentric cam member mounted on a cam shaft engaged with the other end of the lever mechanism, the lever mechanism and the cam shaft being located in the tool case to be rotatable about an axis substantially parallel with the central axis of the follow-up gear, a clutch arm having a front end by which a cam roller is supported and a base end attached to the cam shaft through a one-way clutch, a cam plate secured to the housing for forcing and driving the cam roller, two driving gears supported by the housing and operatively engaged with each other with a space having a distance larger than a width of the opening end of each of the openings, and a power transmission mechanism for transmitting a driving power of the electric motor to the two driving gears.

According to the pipe cutting device of the type defined hereinabove, the tool case is attached to the housing to be rotatable, and by rotating manually or electrically the tool case so that the openings of the tool case and the follow-up gear provided for the tool case substantially align with the opening provided for the housing, is formed a pipe inserting passage for inserting a pipe from the opening side of the openings of these members towards the central portion of the tool case. Two driving gears meshed with the follow-up gear are driven by a motor through the power transmission mechanism to continuously rotate the follow-up gear and thereby rotate the tool case. The rotation of the tool case drives the cam roller to operate the cam plate, and the clutch arm is rotated by predetermined angles by evey one rotation of the tool case thereby to minutely rotate the eccentric cam by predetermined angles through the one-way clutch. The rotation of the eccentric cam rotates the lever mechanism which is operatively connected to the cutter. Thus, the pipe squeezed between the cutter and the support rollers located in the tool case is cut in minutely by every one rotation of the tool case.

DESCRIPTION OF THE PREFERRED EMBODIMENTS

Figure 1:
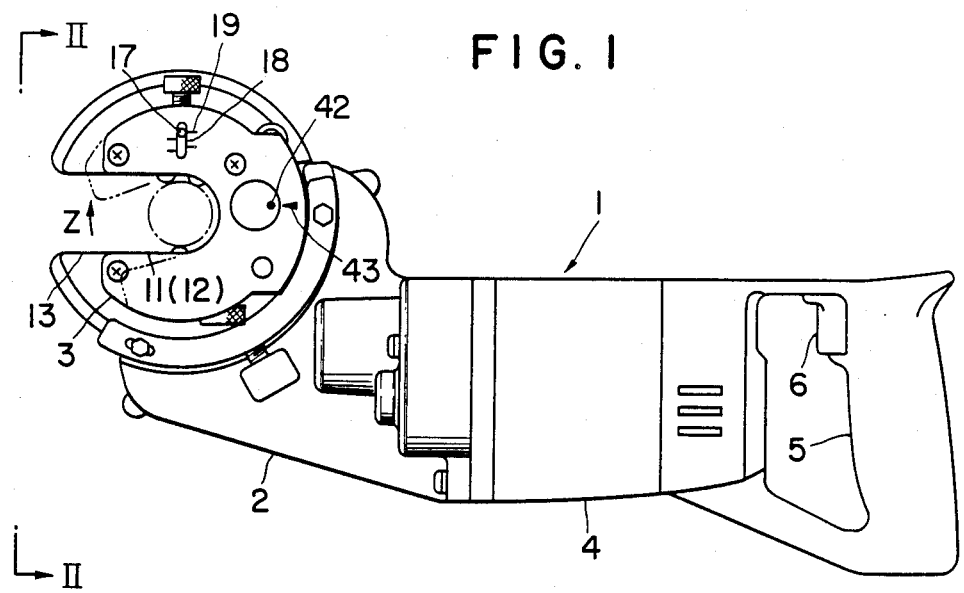
FIG. 1 is a schematic front view of a pipe cutting device according to this invention.
Figure 2:
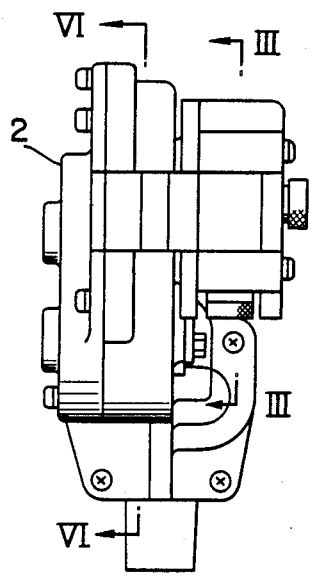
FIG. 2 shows a side view of the pipe cutting device shown in FIG. 1 as viewed from the arrowed direction II.
Figure 4:
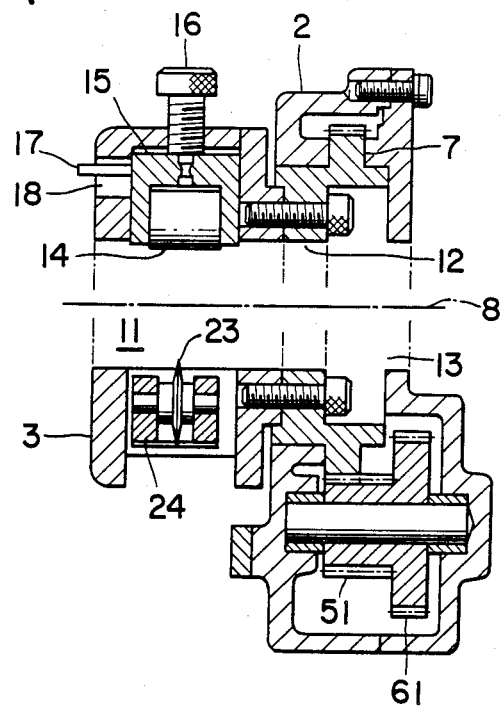
FIG. 4 shows a cross sectional view taken along the line IV—IV shown in FIG. 3.
Figure 5:
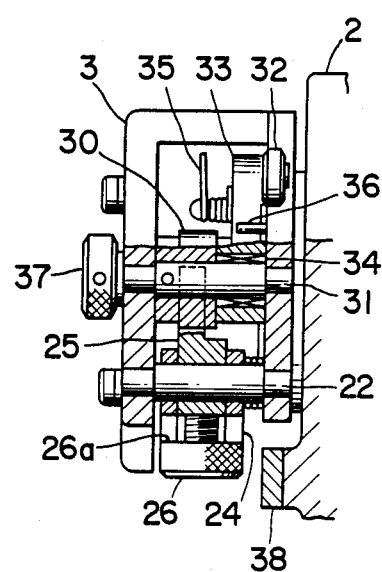
FIG. 5 shows a cross sectional view taken along the line V—V also shown in FIG. 3.

FIG. 1 is a schematic front view of a pipe cutting device 1 according to this invention. The pipe cutting device 1 is provided with a housing 2 to the front end of which is rotatably attached a tool case 3 and an electric motor 4 is attached to the base portion of the housing 2 for driving the tool case 3. The electric motor 4 is of the same type as that used for an electric motor driven tool such as a portable electric drill and is operated by a trigger switch 6 attached to a grip handle 5 formed at the rear end of the housing 2. To the tool case 3 is secured a follow-up gear 7 as shown in FIG. 4, which is held in the housing 2 slidably and rotatably so as to rotate around the central axis of the follow-up gear 7 together with the tool case 3. The tool case 3 and the follow-up gear 7 are provided with U-shaped openings 11 and 12 respectively including the common central axis 8 and opened to the side of the central axis 8. The housing 2 is also provided with an opening 13 in alignment with the openings 11 and 12.

Figure 3:
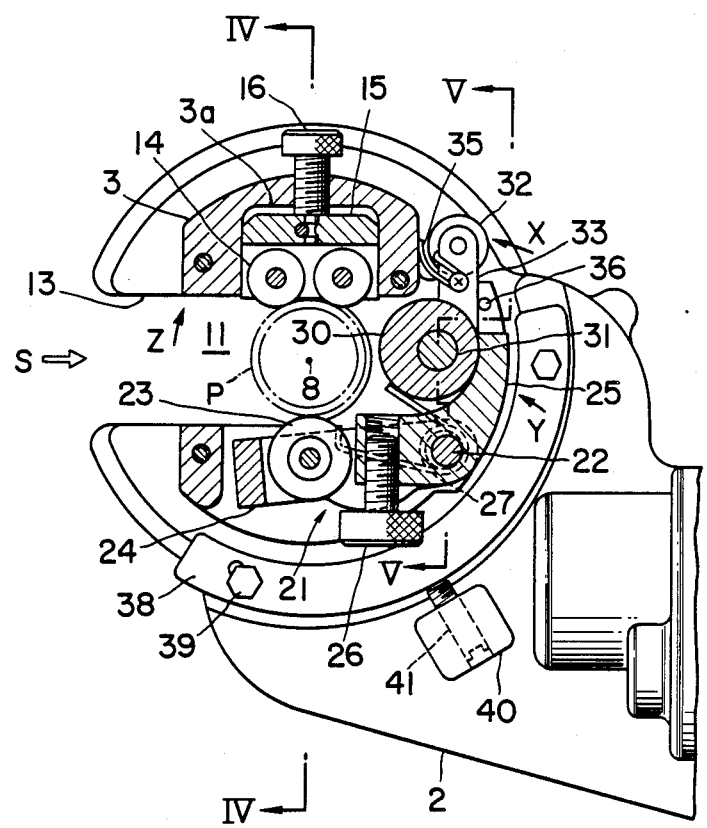
FIG. 3 shows a cross sectional view taken along the line III—III shown in FIG. 2.

As shown in FIG. 3, the tool case 3 is provided with a recessed portion 3a into which a block 15 is fitted so as to be slidable in a direction towards or apart from the central axis 8 and to the block 15 are attached two support rollers 14 having outer surfaces facing the opening 11. A screw 16 is screwed with the tool case 3 for adjusting the positions of the support rollers 14 and the front end of the adjusting screw 16 is rotatably engaged with the block 15. A pin 17 is secured to the block 15 so as to project therefrom into a slot 18 formed in the front plate of the tool case 3 to be movable in the slot 18 and a scale 19 for indicating the diameter of a pipe to be cut is marked on the peripheral surface of the slot 18. A lever 21 is secured to the tool case 3 through a shaft 22 to be rotatable thereabout and the lever 21 comprises substantially the ] -shaped first lever member 24 rotatably supporting a circular cutter 23, a second lever member 25 foldably coupled with the first lever member 24 through the shaft 22, and an adjusting screw 26 for adjusting the folding angle between the first and second lever members 24 and 25. The adjusting screw 26 is in screw engagement with the second lever member 25 and the flange portion 26a of the screw 26 abuts against the first lever member 24 thereby to adjust the position of the cutter 23 in accordance with the screwed amount of the adjusting screw 26 and in accordance with the diameter of the pipe to be cut. A snap spring 27 is also located for intending the integration of the first and second lever members 24 and 25 by urging the first lever member 24 against the flange portion 26a of the screw 26 and for urging the front end of the second lever member 25 against an eccentric cam 30. The eccentric cam 30 is mounted on a cam shaft 31 which is rotatably secured to the tool case 3 and a clutch arm 33 to which a cam roller 32 is journaled is attached to the front end of the cam shaft 31 through a one-way clutch 34, which acts to transmit the rotation movement of the clutch arm 33 only in a direction arrowed by X in FIG. 3 to the cam shaft 31. The clutch arm 33 is urged by a return spring 35 in a direction reverse to the arrowed direction X and the returning position of the clutch arm 33 is limited by a stopping pin 36. A thumb nut 37 is secured to the projecting end of the cam shaft 31.

A cam plate 38 for operating the cam roller 32 is secured to the housing 2 by means of two bolts 39 as shown in FIG. 1 and the cam plate 38 has a substantially arcuate configuration so as to minutely adjust the thrusted-in amount of the cam roller 32 by a thrust screw 41 screwed in a washer 40 projectingly located on the housing 2.

Figure 6:
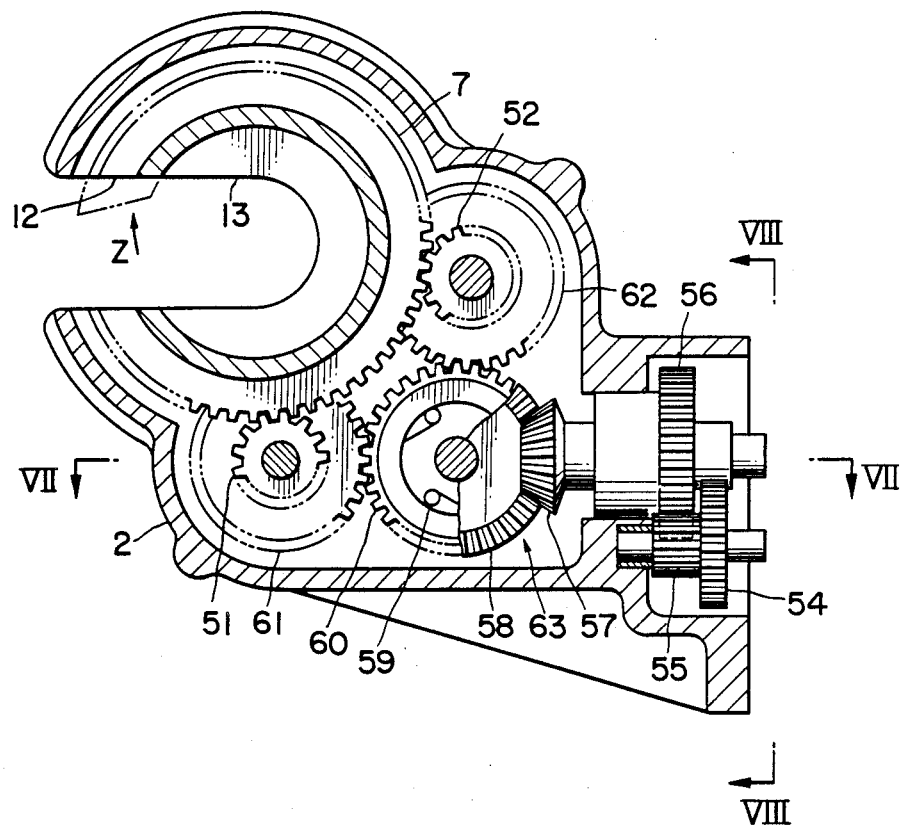
FIG. 6 shows a cross sectional view taken along the line VI—VI shown in FIG. 2.
Figure 7:
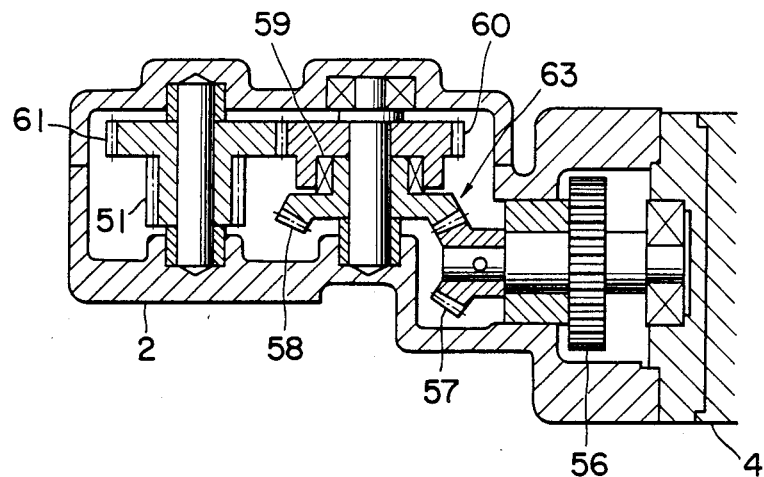
FIG. 7 shows a cross sectional view taken along the line VII—VII shown in FIG. 6.
Figure 8:
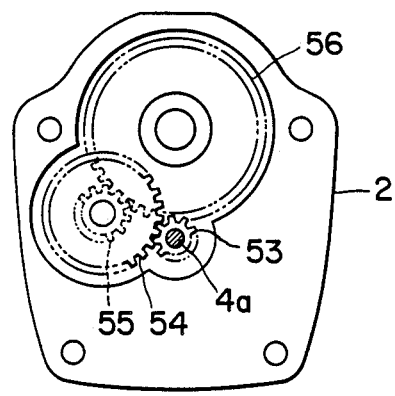
FIG. 8 shows a side view as viewed from the arrowed direction VIII shown in FIG. 6.

Referring to FIGS. 6 through 8, with the follow-up gear 7 are meshed drive gears 51 and 52 provided with the same gear numbers with each other and spaced by a distance more than the width of the opening 13 within the housing 2. Within the housing 2 is also located a power transmission mechanism for transmitting the rotation of the output shaft 4a of the motor 4 to the drive gears 51 and 52, and the power transmission mechanism is constructed by a gear train 63 which comprises a driving gear 53 secured to the output shaft 4a of the motor 4, a first gear 54 meshed with the driving gear 53, a second gear 55 rotated together with the first gear 54, a third gear 56 meshed with the second gear 55, a first bevel gear 57 rotated together with the third gear 56, a second bevel gear 58 meshed with the first bevel gear 57, a fourth gear 60 operatively engaged with the second bevel gear 58 through a one-way clutch 59, and fifth and sixth gears 61 and 62 meshed with the fourth gear 60 and rotated together with the drive gears 51 and 52, respectively, the fifth and sixth gears 61 and 62 being provided with the same gear numbers with each other. The one-way clutch 59 is located so that the tool case 3 can be easily rotated by the hand of the operator when the operation of the motor 4 stops.

The pipe cutting device having the construction described hereinbefore according to this invention will be operated by the manner described hereunder.

When it is required to cut a pipe generally having a circular cross section in use of the pipe cutting device 1, the positioning of the support rollers 14 is first performed by adjusting the screw 16 in accordance with the diameter of the pipe to be cut. With the embodiment of this invention, in the first time, the block 15 is moved by the adjusting screw 16 so that the pin 17 is moved to the position of the scale 19 corresponding to the diameter of the pipe to be cut. The cam shaft 31 is then rotated so that the cutter 23 is moved to a portion most apart from the support rollers 14, i.e. so that the front end portion of the second lever 25 contacting the eccentric cam 30 is moved to the forwardmost position in the arrowed direction Y in FIG. 3. This setting of the second lever 25 may be conveniently achieved by lining up the mark 42 marked on the thumb nut 37 with the mark 43 marked on the front plate of the tool case 3 as shown in FIG. 1. The tool case 3 is then manually rotated in the arrowed direction Z to substantially align the openings 11 and 12 with the opening 13 of the housing 2. In this state, a pipe P to be cut is inserted into the openings from the side of the openings along the arrowed direction S shown in FIG. 3 and the adjusting screw 26 is rotated until the cutter 23 softly contacts to the peripheral surface of the pipe P, which is now contacting the support rollers 14.

In a case where the pipe P has already been secured to the wall of a building and the like, the pipe cutting operation can be done merely by holding the pipe cutting device by the hand of the operator, and on the other hand, when the pipe P is not secured, the pipe P as well as the cutting device 1 is manually held and the motor 4 of the cutting device 1 is driven by the trigger switch 6. The rotation of the output shaft 4 of the motor 4 is transmitted to the drive-gears 51 and 52 through the gear train 63 and the follow-up gear 7 is in turn driven thereby to rotate the tool case 3 in the arrowed direction Z. Although the follow-up gear 7 is provided with the opening 12, the follow-up gear 7 can be rotated continuously smoothly in engagement with two drive gears 51 and 52. According to the rotation of the tool case 3, the cam roller 32 is brought into contact with the side surface of the cam plate 38 and driven to rotate the clutch arm 33 by predetermined swing angles in the arrowed direction X with respect to every one rotation of the tool case 3. In accordance with the rotation of the clutch arm 33, the cam shaft 31 is minutely moved through the operation of the one-way clutch 34, so that the eccentric cam 30 is rotated by predetermined angles and the lever 21 is then rotated by small angles in a direction reverse to the direction Y, whereby the cutter cuts in the outer periphery of the circular pipe P by every one rotation of the tool case 3. The adjustment of the cut-in amount of the pipe P can be performed by changing the set value of the inclination of the cam plate 38 by means of the screw 41. When the pipe P is cut off, the motor 4 is switched off and substantially the same cutting operation is repeated when it is further required to cut a pipe.

Figure 9:
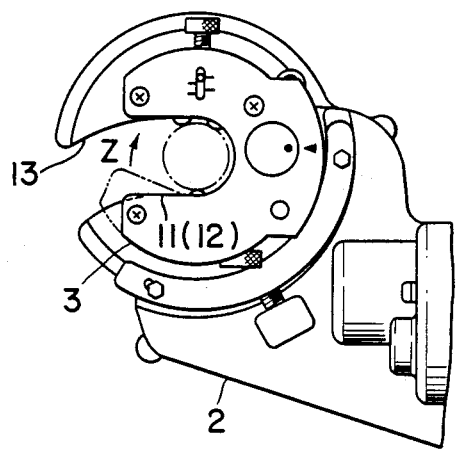
FIG. 9 shows a schematic front view, partially cut away, of another embodiment of the pipe cutting device according to this invention.

FIG. 9 is a schematic view showing the front portion of another embodiment of the pipe cutting device according to this invention, in which the opening 13 of the housing 2 is curved arcuately at the opening end thereof, which fact is significantly different from the former embodiment of this invention illustrated in FIGS. 1 through 8.

The pipe just after the cut-off operation is usually displaced from the central portion of the tool case 3 and the pipe may likely be pinched between the edge portions of the opening 11 of the tool case 3 rotating in the arrowed direction Z (i.e. the opening 12 of the follow-up gear 7) and the opening 13 of the housing 2. With the embodiment shown in FIG. 9, however, the pipe can be guided in the central portion of the tool case 3 by the curved end portion of the opening 13, thus preventing the accidental pinching of the pipe.

It will of course be understood that this invention is not limited to the embodiments described hereinbefore and various other modifications and changes will be able to be permitted. For example, the block 15 supporting the support rollers 14 may be replaced with a block provided with support rollers in accordance with outer diameter of a pipe to be cut and a block corresponding to the outer diameter of the pipe to be cut is fitted into the recessed portion 3a without being provided with the adjusting screw 16. The location of the one-way clutch 59 in the foregoing embodiments makes easy the manual rotating operation of the tool case 3, but the one-way clutch 59 may be eliminated in a case where the tool case 3 is minutely moved by the inching operation of the motor 4 or a case where the reduction ratio of the gear train 63 is considerably small. Moreover, chain or belt means are preferably used in place of gear means as a power-transmission mechanism for transmitting the rotation of the output shaft of the motor 4 to the drive gears. In addition, since the lever 21 of the embodiments described comprises the first lever member 24 supporting the cutter 23, the second lever member 25 foldably coupled with the first lever emmber 24, and the adjusting screw 26 for adjusting the folding angle between the first and second lever members 24 and 25, even in a case where a pipe having a diameter largely different from a pipe which has already been cut is to be cut, the pipe can be cut at the central portion of the tool case 3 by largely moving the cutter 23 forwardly or rearwardly and vibrations caused by the rotation of the tool case 3 can be extremely restrained. On this point, however, in a case where a pipe having a diameter not so largely different from a pipe already cut is to be cut, an integral lever member which is not foldable may be utilized in place of the lever 21, and in this case, the cam shaft 31 is manually rotated to adjust the position of the cutter 23.

As described hereinbefore, according to this invention, a pipe is easily inserted into the central portion of the tool case from the side portion of the openings of the tool case, follow-up gear and housing which are substantially aligned to cut the pipe, thus being capable of cutting a pipe having relatively long length at an intermediate portion thereof. The cutting operation of the pipe is performed by the driving force of a motor and the cut-in operation by the cutter is also performed automatically and minutely by every one rotation of the tool case, so that labour and working times of an operator can be extremely reduced in comparision with the use of a conventional lever drive type pipe cutting device. According to these features, a stainless steel made pipe which is hard to cut in use of a conventional cutting device can easily be cut.

What is claimed is:

1. A pipe cutting device comprising:
   a housing provided with a U-shaped opening at one end thereof;
   a follow-up gear mounted within an inner space of said housing and being rotatable about a central axis thereof;
   a tool case secured to an outer and surface of said follow-up gear, said tool case and said follow-up gear being provided with U-shaped openings respectively, which substantially align with said opening of said housing, all of said U-shaped openings being opened on a side of said central axis for inserting a pipe to be cut;
   a drive means connected to said housing for providing driving power;
   a pair of support rollers located in said tool case with the outer peripheral surfaces thereof facing said opening of the tool case;
   a cutter located in said tool case at a portion facing said support rollers across said opening of said tool case;
   a lever means pivotally supported at an intermediate portion thereof on the tool case and having one end supporting said cutter;
   an eccentric cam member mounted on a cam shaft so as to engage with another end of said lever means, said eccentric cam member and said cam shaft being located in said tool case to be rotatable about an axis substantially parallel with said central axis of the follow-up gear;
   a clutch arm having a front end supporting a cam roller and a base end attached to said cam shaft through a one-way clutch;
   a cam plate secured to said housing and having a surface for engaging with said cam roller;
   two driving gears supporting on said housing and in mesh with said follow-up gear respectively, and spaced from one another by a distance larger than a width of the opening end of each of said openings; and a power transmission mechanism for transmitting a driving power of said drive means to said two driving gears to in turn drive said follow-up gear and rotate said tool case.

2. The pipe cutting device according to claim 1 wherein said power transmission mechanism comprises a gear train.

3. The pipe cutting device according to claim 2, wherein said gear train comprises a plurality of gears operatively engaged with each other and a one-way clutch disposed between at least two of said plurality of gears.

4. The pipe cutting device according to claim 1, wherein said lever means comprises a first lever member having a free end supporting said cutter and having another end pivotally supported on said tool case; a second lever member operatively connected to said first lever member to be foldable with respect to said first lever member; and a screw means screwed with said second lever member for adjusting a folding angle between said first and second lever members.

5. The pipe cutting device according to claim 1 wherein said housing is provided with an arcuately curved edge portion defining the opening end of said opening of the housing.

* * * * *